United States Patent
Jain et al.

(10) Patent No.: US 12,082,294 B2
(45) Date of Patent: Sep. 3, 2024

(54) ENTERPRISE FABRIC EXTENSION TO EXTENDED AND EXTERNAL NETWORKS WITHOUT ROUTE IMPORTS AND EXPORTS

(71) Applicant: Cisco Technology, Inc., San Jose, CA (US)

(72) Inventors: Prakash C. Jain, Fremont, CA (US); Parthiv Shah, Fremont, CA (US); Anton Smirnov, Braine-l'Alleud (BE)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 17/554,887

(22) Filed: Dec. 17, 2021

(65) Prior Publication Data

US 2023/0199465 A1    Jun. 22, 2023

(51) Int. Cl.
| | |
|---|---|
| *H04W 8/00* | (2009.01) |
| *H04W 60/04* | (2009.01) |
| *H04W 76/12* | (2018.01) |
| *H04W 76/15* | (2018.01) |

(52) U.S. Cl.
CPC .......... *H04W 8/005* (2013.01); *H04W 60/04* (2013.01); *H04W 76/12* (2018.02); *H04W 76/15* (2018.02)

(58) Field of Classification Search
CPC ..... H04W 8/005; H04W 76/12; H04W 76/15; H04W 60/04
USPC ....... 455/435.1, 432.1, 418, 422.1, 436, 442
See application file for complete search history.

(56) References Cited

U.S. PATENT DOCUMENTS

| | | | |
|---|---|---|---|
| 9,769,017 B1 | 9/2017 | Jose et al. | |
| 2013/0341396 A1* | 12/2013 | Tung | G06F 13/385 |
| | | | 235/382 |
| 2015/0249599 A1* | 9/2015 | Song | H04L 45/46 |
| | | | 709/226 |
| 2016/0381124 A1 | 12/2016 | Iwang et al. | |
| 2018/0102968 A1 | 4/2018 | Hallivuori et al. | |
| 2019/0379572 A1 | 12/2019 | Yadav et al. | |
| 2021/0135984 A1 | 5/2021 | Jain et al. | |
| 2021/0176173 A1 | 6/2021 | Hooda et al. | |
| 2022/0191766 A1* | 6/2022 | Li | H04W 48/16 |

\* cited by examiner

*Primary Examiner* — Nghi H Ly
(74) *Attorney, Agent, or Firm* — Lee & Hayes, P.C.

(57) ABSTRACT

Techniques and architecture are described for providing connectivity and monitoring the connectivity of a fabric network controller/control plane with external and extended network controllers/control planes. The techniques and architecture provide a method that includes provisioning a control plane of a first network with a control plane of a second network. The method also includes establishing a session between the control planes of the first and second networks. The method further includes registering nodes of the first network with the control plane of the second network and providing, by the control plane of the first network to the control plane of the second network, information related to endpoints within the first network. The method also includes monitoring, reporting, and possibly taking corrective actions, by the control plane of the second network, with respect to connectivity/status between the control plane of the first network and the control plane of the second network.

20 Claims, 8 Drawing Sheets

PROVISION AT LEAST ONE OF (I) A CONTROL PLANE OR (II) A CONTROLLER OF A FIRST NETWORK WITH AT LEAST ONE OF (I) A CONTROL PLANE OR (II) A CONTROLLER OF A SECOND NETWORK TO ALLOW COMMUNICATION BETWEEN THE AT LEAST ONE OF (I) THE CONTROL PLANE OR (II) THE CONTROLLER OF THE FIRST NETWORK AND THEAT LEAST ONE OF (I) THE CONTROL PLANE OR (II) THE CONTROLLER OF THE SECOND NETWORK
302

↓

ESTABLISH A SESSION BETWEEN THE AT LEAST ONE OF (I) THE CONTROL PLANE OR (II) THE CONTROLLER OF THE FIRST NETWORK AND THE AT LEAST ONE OF (I) THE CONTROL PLANE OR (II) THE CONTROLLER OF THE SECOND NETWORK
304

↓

REGISTER NODES OF THE FIRST NETWORK WITH THE AT LEAST ONE OF (I) THE CONTROL PLANE OR (II) THE CONTROLLER OF THE SECOND NETWORK
306

↓

PROVIDE, BY THE AT LEAST ONE OF (I) THE CONTROL PLANE OR (II) THE CONTROLLER OF THE FIRST NETWORK TO THE AT LEAST ONE OF (I) THE CONTROL PLANE OR (II) THE CONTROLLER OF THE SECOND NETWORK, INFORMATION RELATED TO ENDPOINTS WITHIN THE FIRST NETWORK
308

↓

MONITOR, BY THE AT LEAST ONE OF (I) THE CONTROL PLANE OR (II) THE CONTROLLER OF THE SECOND NETWORK, CONNECTIVITY BETWEEN THE AT LEAST ONE OF (I) THE CONTROL PLANE OR (II) THE CONTROLLER OF THE FIRST NETWORK AND THE AT LEAST ONE OF (I) THE CONTROL PLANE OR (II) THE CONTROLLER OF THE SECOND NETWORK
310

ENTERPRISE FABRIC EXTENSION TO EXTENDED AND EXTERNAL NETWORKS WITHOUT ROUTE IMPORTS AND EXPORTS

TECHNICAL FIELD

The present disclosure relates generally to enterprise fabric extension to extended networks and external networks, and more particularly to, extending an enterprise access network or fabric to extended networks and external networks by allowing a fabric control plane or controller to communicate with controllers or control planes of extended networks and external networks.

BACKGROUND

Enterprise access networks such as, for example, enterprise fabric networks, software defined access (SDA) networks, software defined (SD) networks, overlay networks, etc., (referred to herein as enterprise fabric networks or fabric networks) help in scaling of endpoints in current enterprise networks with an increasing number of wireless devices, e.g., mobile devices, Internet-of-Things devices (IoT), etc., as well as virtual endpoints (virtual machines (VMs)) within devices. In addition to connectivity, the enterprise fabric networks also provide on-demand monitoring and services, e.g., assurance, serviceability, security, etc., for all endpoints in the enterprise fabric network.

In addition to the endpoints directly connected to an enterprise fabric network, the enterprise fabric network also needs to provide connectivity and monitoring services to endpoints in adjacent extended networks. One example of an extended network is an extended wireless access network managed by a wireless controller. Another example of an extended network is an extended wired access network, such as, for example, an extended layer 2 (L2) access network connected to a distribution switch, e.g., a fabric edge, and managed by another aggregator/controller, or a stackwise-virtual (SVL)/flex control plane. Another example of an extended wired access network is an extended IoT device network managed by an IoT controller. The enterprise fabric network also needs to provide connectivity and monitoring services to endpoints in adjacent external networks. An example is an external data center or cloud network managed by a data center or cloud control plane/controller. Another example is an external software defined wide access network (SDWAN) managed by a SDWAN controller. For such extended connectivity, there is a need for the fabric control plane, e.g., a map server/map resolver (MSMR), to extend itself for extended and external networks to provide connectivity and monitoring services to the endpoints in the extended and external networks via the fabric network.

Generally, the endpoints in the extended and external networks are not directly connected to fabric edges or the fabric control plane (e.g., locator/ID separation protocol (LISP) switches and the MSMR or centralized route reflector/control plane for border gateway protocol-ethernet virtual private network (BGP-EVPN)), but are connected to an extended or external node. For example, such an extended or external mode may include an access point or external node connected to, for example, a LISP switch, etc., which is managed by a different control plane and controller. Such an arrangement makes it difficult for the fabric network to provide connectivity and monitoring services for the endpoints of the extended and external networks.

As an example, a user may be operating a software defined access (SDA) network with fabric enabled wireless, e.g., a fabric network configured as a fabric enabled wireless network. In this network scenario, multiple platforms, e.g., wireless controller (WLC), MSMR, switch, access point (AP), wireless client device, dynamic host configuration protocol (DHCP) server, identity services engine (ISE), etc., work together to provide wireless client connectivity from the extended wireless network. In this case, the wireless client is attempting to connect to the network with the following flow. Before the wireless client device starts operating within the network, an access point needs to have a control and provisioning of wireless access points (CAP-WAP) tunnel with the WLC. The WLC needs to have established an LISP session with the MSMR. Finally, the switch needs to have a virtual extensible local access network (LAN) (VXLAN) access tunnel with the access point. Once this has occurred, the wireless client sends a DHCP discover message via the access point. The access point sends the DHCP discover message to the switch over the VXLAN tunnel. Additionally, the access point informs the WLC of a new client MAC address over the CAPWAP tunnel. The WLC registers the client media access control (MAC) address with the MSMR as the WLC has a LISP session with MSMR. Finally, the switch sends a DHCP request to the DHCP server and receives a DHCP offer that may be sent to the access point where the wireless client is connected. The switch may receive the access point information based on the WLC registering the MAC address with the MSMR and the switch receiving this information from the MSMR.

In this situation, if the session communication between the WLC and the MSMR is broken before the wireless client device connects, then the switch and access point may not know about it. Once the session is established, there is no mechanism to monitor the session failure between the fabric control plane and the wireless control plane and then communicate it to either side of the network components. This is because of the fact that these are two different networks, i.e. the fabric network and the extended wireless network controlled by two different control planes/controllers. For example, if the WLC or MSMR has a LISP authentication key misconfigured, the LISP session between the MSMR and the WLC is not established. However, this does not result in an access tunnel between the access point and the XTR to be notified or fail. In such a scenario, the wireless client device may try to send a DHCP discover and the DHCP server may send a DHCP offer back to the switch. However, the switch may drop the DHCP offer because the WLC is unable to register the client MAC address with the MSMR. This becomes a debugging nightmare since network administrators and engineers are not able to determine why the wireless client is not able to get the DHCP address via fabric network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture allowing for any controller of an extended network or external network to communicate with the control plane or controller of an access network, e.g., a fabric network. For example, any controller of an external network or extended network may communicate with a map server/map resolver (MSMR) of the fabric network. Thus, the MSMR receives knowledge of a corresponding external network or extended network from the corresponding controller or control plane of the extended network or external network and vice versa.

In particular, the fabric control plane, e.g., MSMR, is extended for extended networks and external networks by enabling exchange of endpoints/prefix mappings directly between the fabric control plane and any external network control plane or controller and any extended network control plane or controller. This is in contrast to learning at switches using route import/export that usually occur with LISP and thus avoids the problem of loops. The techniques and architecture provide for connectivity as well as monitoring connectivity between the fabric control plane and the control planes of external networks and extended networks, e.g., a wireless control plane, a flex/SVL control plane, cloud/data center (DC)/software defined wide access network (SD-WAN) control planes or controllers, etc. The fabric control plane also accepts registration of external nodes and extended nodes for external network services and extended network services. The fabric control plane accepts registration/sessions/mappings/service insertion parameters directly from the external network control planes and the extended network control planes. Previously, for external networks, the MSMR obtains the registrations/sessions/mappings/service insertion parameters from the edge switches or border switches, which previously obtained such information via route import/exports from routing protocols. By not using route imports and route exports, the chances of loops and other issues are avoided.

The fabric control plane may also notify the connectivity and monitoring status to interested fabric components, e.g., FEs, switches, borders, etc., using a message in the form of an extended-map-notify message. The fabric control plane may also notify the connectivity and monitoring status to interested external network components and extended network components using the extended-map-notify message. In configurations, the extended map-notify message may be an "unsolicited notify" message or it may be in the form of "a publication" message as per "pub-sub" or "publication-subscription" mechanism, e.g., publication to whoever subscribes for the notification. In configurations, the extended-map-notify message not only notifies the enporint identifier (EID)-routing locator (RLOC) mappings for extended network endpoints and external endpoints, but also notifies with information regarding status, assurance, serviceability, service insertion parameters, sessions, key mismatches, etc., between the fabric control plane and external network control planes and external network control planes.

In configurations, the extended map notify uses distinguished names (DNs) and private LISP canonical address formats (LCAF) to carry all required connectivity and monitoring information. Additionally, in configurations, and extended network controller or an extended external network controller, may talk to the fabric control plane directly or via a network architecture controller (NAC), e.g., Cisco® digital network architecture controller (DNAC), (the fabric controller or access network controller). Alternatively, if the extended network or external network has a controller as well as a control plane, the external network controller or extended network controller may talk to the NAC and the external network control plane or extended network control plane may communicate with the fabric control plane (MSMR) to provide connectivity and monitoring services.

As an example, a method may include provisioning a control plane of a first network with a control plane of a second network to allow communication between the control plane of the first network and the control plane of the second network. The method may also include establishing a session between the control plane of the first network and the control plane of the second network. The method may further include registering nodes of the first network with the control plane of the second network and providing, by the control plane of the first network to the control plane of the second network, information related to endpoints within the first network. The method may also include monitoring, by the control plane of the second network, connectivity between the control plane of the first network and the control plane of the second network.

In configurations, the method may further include provisioning a control plane of a third network with a control plane of the second network to allow communication between the control plane of the third network and the control plane of the second network. Such a method may also include establishing a session between the control plane of the third network and the control plane of the second network. Such a method may additionally include registering nodes of the third network with the control plane of the second network and providing, by the control plane of the third network to the control plane of the second network, information related to endpoints within the third network. Such a method may also include monitoring, by the control plane of the second network, connectivity between the control plane of the third network and the control plane of the second network.

In configurations, the second network is an access network, the first network is one of a wireless access network, a layer 2 (L2) network, a cloud network, an Internet of Things (IoT) network, or a software defined wide access network (SDWAN), and the third network is one of a wireless access network, a layer 2 (L2) network, a cloud network, an Internet of Things (IoT) network, or a software defined wide access network (SDWAN).

In configurations, provisioning the control plane of the first network with the control plane of the second network comprises instructing, by a controller, the control plane of the first network to exchange address/information to connect and send first network end point information and metadata from the control plane of the first network to the control plane of the second network. The provisioning may also comprise configuring, by the controller, the control plane of the second network to allow session/connection and learning of end point information and metadata related to end points of the first network from the control plane of the first network. The provisioning may further comprise configuring, by the controller, one of (i) a service border of the first network, (ii) a switched virtual interface (SVI) of an edge of the first network, or (iii) a SVI of an access point of the first network for first network node detection; and receiving a message, wherein the message comprises one or more of mappings for endpoints, first network status, assurance, serviceability, service insertion parameters, session information, or key mismatches.

In configurations, establishing the session between the control plane of the first network and the control plane of the second network and registering nodes of the first network with the control plane of the second network comprises initiating, by the control plane of the first network, the session. The establishing may also comprise establishing, by the control plane of the first network, the session. The establishing may further comprise monitoring, by the control plane of the second network, connectivity between the control plane of the first network and the control plane of the second network. The establishing may additionally comprise registering, by one of (i) a service border of the first network, (ii) an edge of the first network, or (iii) an access point of the first network, network nodes.

In configurations, the first network is a cloud network and providing, by the control plane of the first network to the control plane of the second network, information related to endpoints within the first network comprises sending, by the control plane of the first network to the control plane of the second network, information including node addresses related to end points of the first network as metadata. The providing may also comprise, based at least in part on a node address match, adding, by the control plane of the first network, mappings of the end points within the first network. The providing may further comprise registering, by the control plane of the second network to a database of the second network, a border of the first network as a routing locator (RLOC). The providing may additionally comprise sending, by the control plane of the second network to the border, a message with the metadata.

In configurations, the first network is one of a wireless access network or a layer 2 (L2) network and providing, by the control plane of the first network to the control plane of the second network, information related to endpoints within the first network comprises sending, by the control plane of the first network to the control plane of the second network, information including node addresses related to end points of the first network as metadata. The providing may also comprise, based at least in part on a node address match, adding, by the control plane of the first network, mappings of the end points within the first network. The providing may further comprise registering, by the control plane of the second network to a database of the second network, either access points or edges of the first network as a routing locator (RLOC). The providing may additionally comprise sending, by the control plane of the second network to either the access points or edges, a message with the metadata.

In configurations, monitoring, by the control plane of the second network, connectivity between the control plane of the first network and the control plane of the second network comprises monitoring, by the control plane of the second network, connectivity between the control plane of the first network and the control plane of the second network. The monitoring may also comprise sending, by the control plane of the second network to the control plane of the first network, a message to establish overlay connectivity with nodes of the first network. The monitoring may further comprise, in response to determining a session failure, sending, by the control plane of the second network to the control plane of the first network, another message to de-establish overlay connectivity with nodes of the first network.

In configurations, the method may further include, prior to provisioning the control plane of the first network with the control plane of the second network to allow communication between the control plane of the first network and the control plane of the second network, exchanging keys between the control plane of the first network and the control plane of the second network.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
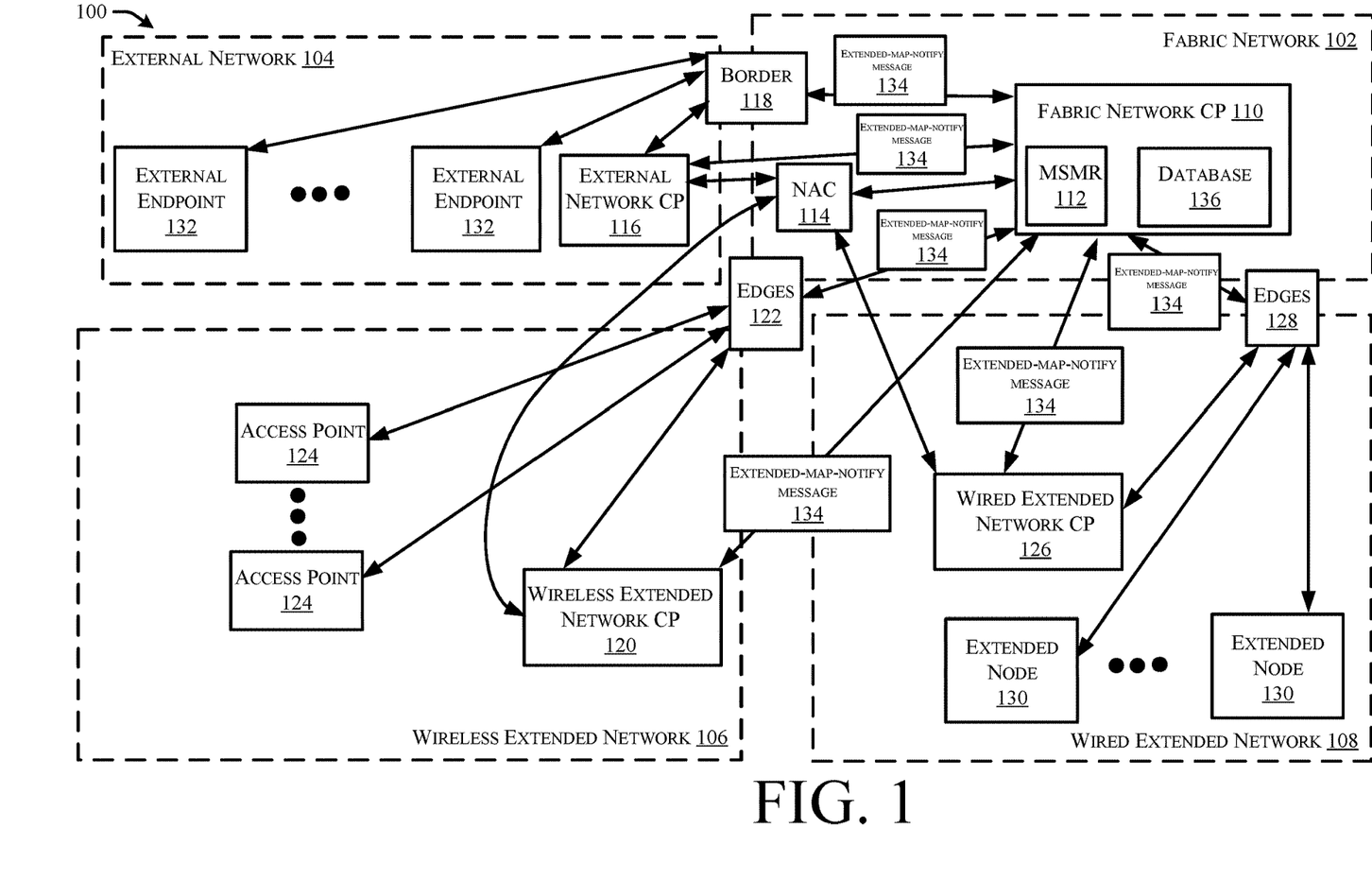
FIG. 1 schematically illustrates an example network arrangement of an access network in the form of a fabric network, an external network, an extended network in the form of a wireless network, and an extended access network 108 in the form of a wired network.

FIG. 1 schematically illustrates an example network arrangement 100 of an enterprise access network in the form of a fabric network 102 (also referred to herein as fabric 102), as well as an external access network 104, e.g., a cloud network, data center, software defined wide access network (SDWAN), etc. FIG. 1 also schematically illustrates an extended access network 106 in the form of a wireless extended access network as well as an extended access network 108 in the form of a wired extended access network, e.g., a layer two (L2) network. While not illustrated, an extended access network may also be in the form of an internet-of-things (IoT) extended access network.

The fabric network 102 incudes a controller and/or a control plane 110 (referred to herein as controller/control plane 110) that includes a map server/map resolver (MSMR) 112. In configurations, the fabric network 102 may also include a network architecture controller (NAC), e.g., Cisco® digital network architecture controller (DNAC). The external access network 104 includes a controller and/or a control plane 116 (referred to herein as controller/control plane 116) and a border (switch) 118, although as is known the external access network 104 generally includes multiple borders 118. External endpoints 132 are also provided within the external access network 104. The wireless extended access network 106 includes a wireless controller and/or a wireless control plane (WLC) 120 (referred to herein as WLC 120) and multiple edges (switches) 122. The wireless extended access network 106 also includes multiple extended nodes in the form of access points 124. The wired extended network 108 includes a controller and/or a control plane 126 (referred to herein as controller/control plane 126) in the form of one of an aggregator/distribution/flex/SVL control plane. The wired extended network 108 also includes multiple edges (switches) 128 and extended nodes (switches) 130.

In configurations, the controller/control plane 116 of the external access network 104 communicates with the fabric controller/control plane 110, e.g., the MSMR 112 of the fabric network 102. The communications include connectivity and monitoring operations performed by the control plane 110 or MSMR 112 of the fabric network 102. Additionally, registration information may be exchanged between the external network controller/control plane 116 and the fabric controller/control plane 110 or MSMR 112. Such information is also exchanged between the fabric control plane 110 and the wireless extended network controller/control plane (WLC) 120 and the wired extended network controller/control plane 126. Extended-map-notify messages 134 may be sent from the fabric network controller/control plane 110 to the external network controller/control plane 116 and/or the border 118 of the external access network 104. Extended-map-notify messages 134 may also be provided from the fabric network control plane/controller 110 to edges 122 of the wireless extended access network 106 and edges 128 of the wired extended access network 108. Extended-map-notify messages 134 may also be provided from the fabric network control plane/controller 110 to the wireless extended controller/control plane 120 of the wireless extended access network 106 and the wired extended network controller/control plane 126 of the wired extended access network 108. Other types of messages (not shown) may also be provided between the various components of FIG. 1.

For the communication between the fabric controller/control plane 110 and the external network controller/control plane 116 and extended network controllers/control planes 120, 126, the components of the network arrangement 100 need to be provisioned. In configurations, prior to the provisioning of the components, keys may be exchanged between the fabric controller/control plane 110 and the external network controller/control plane 116 and extended network controllers/control planes 120, 126 for security purposes. Once security has been established, in configurations, the NAC 114 instructs the external controller/control plane 116 to exchange address information to connect and send external endpoint information and metadata from the external controller/control plane to the fabric controller/control plane 110. The NAC 114 also instructs the wireless extended network controller/control plane 120 and the wired extended network controller/control plane 126 to exchange address information and other information to connect and send extended network endpoint 132 information and metadata from the extended network controller/control planes 120, 126 to the fabric controller/control plane 110. The NAC 114 instructs the fabric controller/control plane 110 to configure itself to allow session and connection as well as learning of external network and extended network endpoints 132 information and metadata from the extended network controller/control planes 120, 126 and the external network controller/control plane 116.

The NAC 114 instructs the border 118 to configure an external network service border for external network node detection and to receive or allow for reception of the extended-map-notify message 134 from the fabric controller/control plane 110. The NAC 114 instructs the edges 122, 128 of the extended networks to configure switchs, e.g., switch virtual interfaces (SVIs), for extended network node detection and to receive or allow to receive the extended-map-notify message.

In configurations, a TCP session establishment between controller/control plane 110 and controllers/control planes 116, 120, 126 and registration/deregistration of extended nodes and external nodes, e.g., access points 124, extended network nodes 130, and external network endpoints 132, is performed. Thus, external network controller/control plane 116 initiates and establishes a transmission control protocol (TCP) session with the fabric controller/control plane 110. The fabric controller/control plane 110 then starts monitoring connectivity between the external controller/control plane 116 and the fabric controller/control plane 110. The border 118 registers or deregisters external network nodes, e.g., external network endpoints 132, from the border (service-ETR/RLOC) based on an underlay interface and route detection.

The extended network controller/control plane 120 initiates and establishes a TCP session with the fabric controller/control plane 110. The fabric controller/control plane 110 then starts monitoring connectivity between the extended network controller/control plane 120 and the fabric controller/control plane 110. The edges 122 register and deregister extended network nodes, e.g., access points 124, from the access points/edges routing locator (RLOC) based on the extended network nodes' MAC/IP detection on the switch interface of the edges 122.

The extended network controller/control plane 126 initiates and establishes a TCP session with the fabric controller/control plane 110. The fabric controller/control plane 110 then starts monitoring connectivity between the extended network controller/control plane 126 and the fabric controller/control plane 110. The edges 128 register and deregister extended network nodes 130 from the edges routing locator (RLOC) based on the extended network nodes' MAC/IP detection on the switch interface of the edges 128.

In configurations, an endpoint information and metadata exchange may occur between the fabric controller/control plane and the external/extended network controller/control planes 116, 120, 126. Thus, the external controller/control plane 116 sends external network endpoint information with external node addresses as metadata to the fabric controller/control plane 110. Based on an external node address match, the fabric controller/control plane 110 adds the external network endpoint mappings and registers the border 118 as an RLOC within a fabric controller/control plane database 136. The fabric controller/control plane 110 sends or publishes an extended-map-notify message 134 to the border 118 with the metadata of the external node, e.g., endpoint 132. The border 118 establishes overlay connectivity to the external node. For the extended network controller/control planes 120, 126, the extended network controller/control planes 120 send extended network endpoint information with extended node addresses as metadata to the fabric controller/control plane 110. The fabric controller/control plane 110, based on an extended node address match, adds the extended networks' endpoint mappings with the registering access edge as RLOC to the fabric controller/control plane database 136. The fabric controller/control plane 110 sends or publishes an extended-map-notify message 134 to the edges 122, 128 with the extended node address as metadata. The edges 122, 128 establish access tunnels to the extended nodes, e.g., access points 124 and endpoints 132.

As previously noted, the fabric controller/control plane 110 monitors connectivity with both the external network controller/control plane 116 and the extended network controllers/control planes 120, 126. Thus, the fabric controller/control plane 110 monitors the fabric controller/control plane's connectivity with both the external network controller/control plane 116, as well as the extended network controller/control planes 120, 126, and sends or publishes extended-map-notify messages 134 to establish or de-establish overlay connectivity with external and extended nodes.

In particular, if the fabric controller/control plane 110 detects a session failure between the fabric controller/control plane 110 and one of the extended network controller/control planes 120, 126, the fabric controller/control plane 110 sends or publishes an extended-map-notify message 134 to the corresponding edges 122, 128 indicating session down and to de-establish the tunnel with the corresponding access points 124/extended nodes 130. The corresponding edges 122, 128 de-establish the tunnels with the corresponding access points 124/extended nodes 130. If the fabric controller/control plane 110 detects a session is up between the fabric controller/control plane 110 and one of the extended network controller/control planes 120, 126, the fabric controller/control plane 110 sends or publishes an extended-map-notify message 134 to the corresponding edges 122, 128 indicating the session is up and to establish tunnels with the corresponding access points 124/extended nodes 130. The corresponding edges 122, 128 establish the tunnels with the corresponding access points 124/extended nodes 130.

If one of the edges 122, 128 detects underlay connectivity failure between corresponding access points 124/extended nodes 130, the corresponding edges 122, 128 instruct the fabric controller/control plane 110 to deregister the corresponding access point 124/extended node 130 from the corresponding edges 122, 128. The fabric controller/control plane 110 deregisters the corresponding access points 124/extended nodes 130 (metadata) from the corresponding edges 122, 128. The fabric controller/control plane 110 sends or publishes an extended-map-notify message 134 to the corresponding controller/control plane 120, 126 to inform the corresponding extended network controller/control plane 120, 126 of the failure.

If one of the edges 122, 128 detects underlay connectivity between corresponding access points 124/extended nodes 130, the corresponding edges 122, 128 instruct the fabric controller/control plane 110 to register the corresponding access point 124/extended node 130 with the corresponding edges 122, 128. The fabric controller/control plane 110 registers the corresponding access points 124/extended nodes 130 (metadata) with the corresponding edges 122, 128. The fabric controller/control plane 110 sends or publishes an extended-map-notify message 134 to the corresponding controller/control plane 120, 126 to inform the corresponding extended network controller/control plane 120, 126 of the connectivity.

If the fabric controller/control plane 110 detects a session failure between the fabric controller/control plane 110 and the external network controller/control plane 116, the fabric controller/control plane 110 sends an extended-map-notify message 134 to the border 118 indicating session down and to de-establish overlay connectivity with the corresponding external nodes, e.g., endpoints 132. The border 118 de-establishes the overlay connectivity with the corresponding external nodes. If the fabric controller/control plane 110 detects a session is up between the fabric controller/control plane 110 and the external network controller/control plane 116, the fabric controller/control plane 110 sends an extended-map-notify message 134 to the border 118 indicating the session is up and to establish overlay connectivity with the corresponding access points 124/extended nodes 130. The border 118 establishes the overlay connectivity with the corresponding external nodes.

If the border detects underlay connectivity failure between the border 118 and external nodes, e.g., external endpoints 132, the border 118 instructs the fabric controller/control plane 110 to deregister the external nodes from the border 118. The fabric controller/control plane 110 deregisters the external nodes (metadata) from the border 118. The fabric controller/control plane 110 sends or publishes an extended-map-notify message 134 to the external network controller/control plane 116 to inform the external network controller/control plane 116 of the failure.

If the border 118 detects underlay connectivity between the border 118 and the external nodes, the border 118 instructs the fabric controller/control plane 110 to register the external nodes, e.g, external endpoints 132. The fabric controller/control plane 110 detects registration of the external nodes 130 (metadata) with the 118. The fabric controller/control plane 110 sends an extended-map-notify message 134 to the external network controller/control plane 116 to inform the external network controller/control plane 116 of the connectivity.

FIGS. 2A-2E collectively illustrate an example flow 200 for allowing a controller/control plane of an access network, e.g., fabric network 102a, to communicate and monitor connectivity with a controller/control plane of an extended access network, e.g., extended access networks 106, 108 or an external access network, e.g., external access network 104. For example, a controller of an external network or extended network may communicate with a map server/map resolver (MSMR) of the fabric network. Thus, the MSMR receives knowledge of a corresponding external network or extended network from the corresponding controller or control plane of the extended network or external network and vice versa.

Figure 2A:
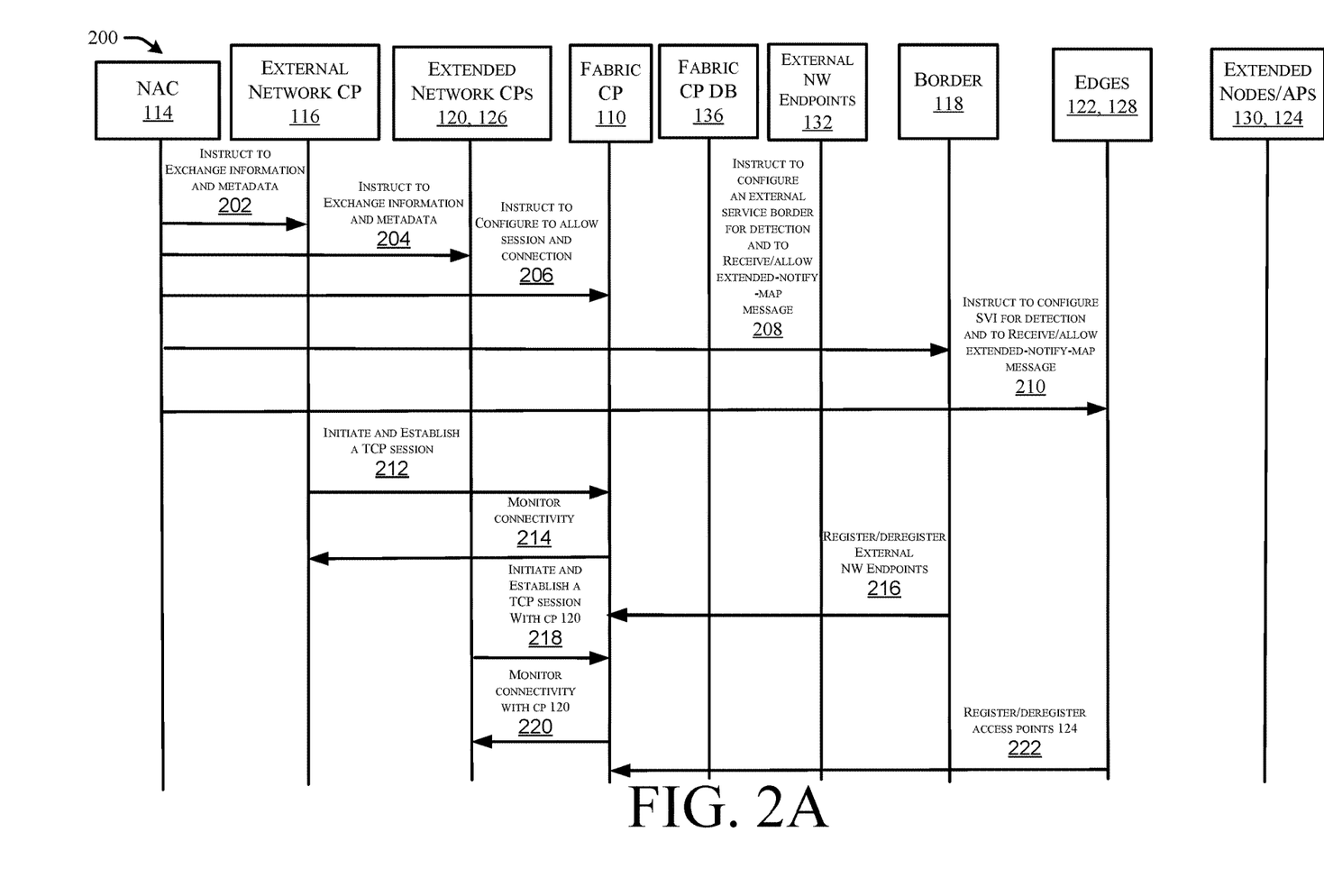
FIGS. 2A-2E collectively illustrate an example flow for allowing a controller/control plane of an access network to communicate and monitor connectivity with a controller/control plane of an extended network and/or an external network.

At 202, the NAC 114 instructs the external controller/control plane 116 to exchange address information to connect and send external endpoint information and metadata from the external controller/control plane to the fabric controller/control plane 110. At 204, the NAC 114 also instructs the wireless extended network controller/control plane 120 and the wired extended network controller/control plane 126 to exchange address information and other information to connect and send extended network endpoint 132 information and metadata from the extended network controller/control planes 120, 126 to the fabric controller/control plane 110.

At 206, the NAC 114 instructs the fabric controller/control plane 110 to configure itself to allow session and connection as well as learning of external network and extended network endpoints 132 information and metadata from the extended network controller/control planes 120, 126 and the external network controller/control plane 116. At 208, the NAC 114 instructs the border 118 to configure an external network service border for external network node detection and to receive or allow for reception of the extended-map-notify message 134 from the fabric controller/control plane 110. At 210, the NAC 114 instructs the edges 122, 128 of the extended networks to configure switchs, e.g., switch virtual interfaces (SVIs), for extended network node detection and to receive or allow to receive the extended-map-notify message.

At 212, external network controller/control plane 116 initiates and establishes a transmission control protocol (TCP) session with the fabric controller/control plane 110. At 214, the fabric controller/control plane 110 then starts monitoring connectivity between the external controller/control plane 116 and the fabric controller/control plane 110. At 216, the border 118 registers or deregisters external network nodes, e.g., external network endpoints 132, from the border (service-ETR/RLOC) based on an underlay interface and route detection.

Figure 2B:
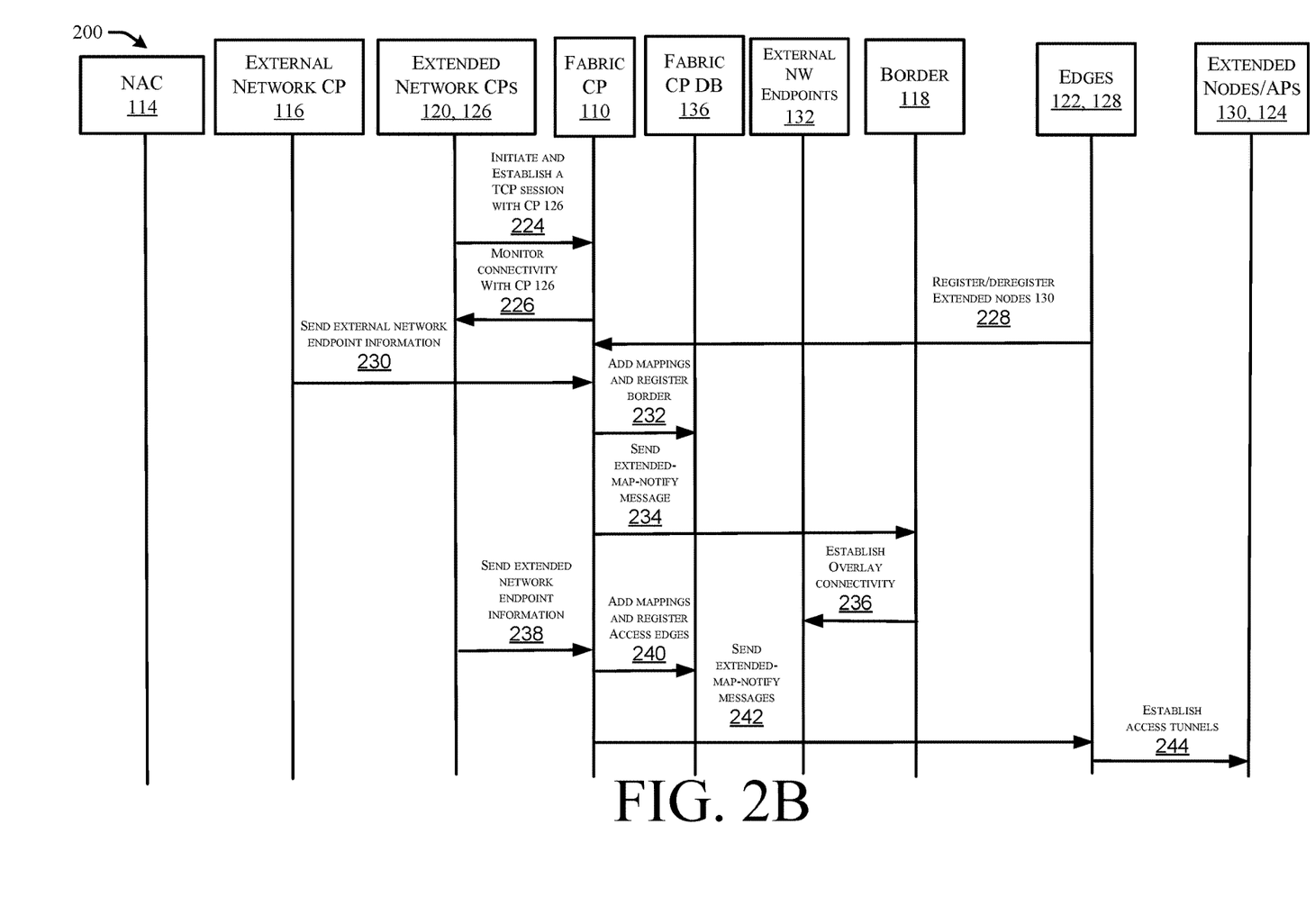

At 218, the extended network controller/control plane 120 initiates and establishes a TCP session with the fabric controller/control plane 110. At 220, the fabric controller/control plane 110 then starts monitoring connectivity between the extended network controller/control plane 120 and the fabric controller/control plane 110. At 222, the edges 122 register and deregister extended network nodes, e.g., access points 124 and extended network nodes 130, from the access points/edges routing locator (RLOC) based on the extended network nodes' MAC/IP detection on the switch interface of the edges 122.

At 224, the extended network controller/control plane 126 initiates and establishes a TCP session with the fabric controller/control plane 110. At 226, the fabric controller/control plane 110 then starts monitoring connectivity between the extended network controller/control plane 126 and the fabric controller/control plane 110. At 228, the edges 128 register and deregister extended network nodes 130 from the edges routing locator (RLOC) based on the extended network nodes' MAC/IP detection on the switch interface of the edges 128.

At 230, the external controller/control plane 116 sends external network endpoint information with external node addresses as metadata to the fabric controller/control plane 110. At 232, based on an external node address match, the fabric controller/control plane 110 adds the external network endpoint mappings and registers the border 118 as an RLOC within a fabric controller/control plane database 136. At 234, the fabric controller/control plane 110 sends an extended-map-notify message 134 to the border 118 with the metadata of the external node, e.g., external network endpoint 132. At 236, the border 118 establishes overlay connectivity to the external node, e.g., external network endpoint 132.

Figure 2C:
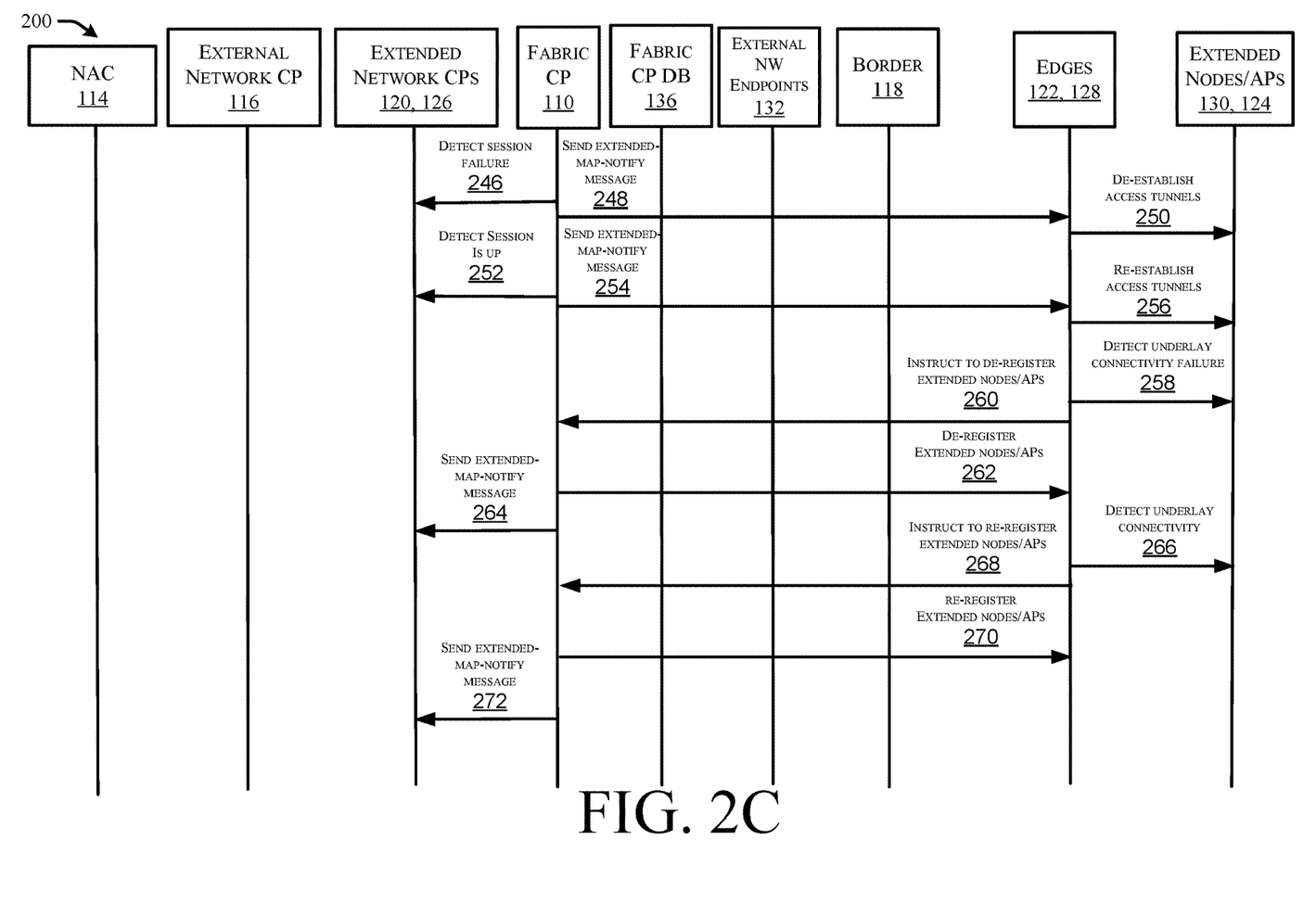

At 238, for the extended network controller/control planes 120, 126, the extended network controller/control planes 120 send extended network endpoint information with extended node addresses as metadata to the fabric controller/control plane 110. At 240, the fabric controller/control plane 110, based on an extended node address match, adds the extended networks' endpoint mappings with the registering access edges as RLOC to the fabric controller/control plane database 136. At 242, the fabric controller/control plane 110 sends extended-map-notify messages 134 to the edges 122, 128 with the extended node address as metadata. At 244, the edges 122, 128 establish access tunnels to the extended nodes, e.g., access points 124 and extended nodes 130.

At 246, the fabric controller/control plane 110 detects a session failure between the fabric controller/control plane 110 and one of the extended network controller/control planes 120, 126. At 248, the fabric controller/control plane 110 sends an extended-map-notify message 134 to the corresponding edges 122, 128 indicating session down and to de-establish the tunnel with the corresponding access points 124/extended nodes 130. At 250, the corresponding edges 122, 128 de-establish the tunnels with the corresponding access points 124/extended nodes 130. At 252, the fabric controller/control plane 110 detects a session is up between the fabric controller/control plane 110 and one of the extended network controller/control planes 120, 126. At 254, the fabric controller/control plane 110 sends an extended-map-notify message 134 to the corresponding edges 122, 128 indicating the session is up and to establish tunnels with the corresponding access points 124/extended nodes 130. At 256, the corresponding edges 122, 128 re-establish the tunnels with the corresponding access points 124/extended nodes 130.

Figure 2D:
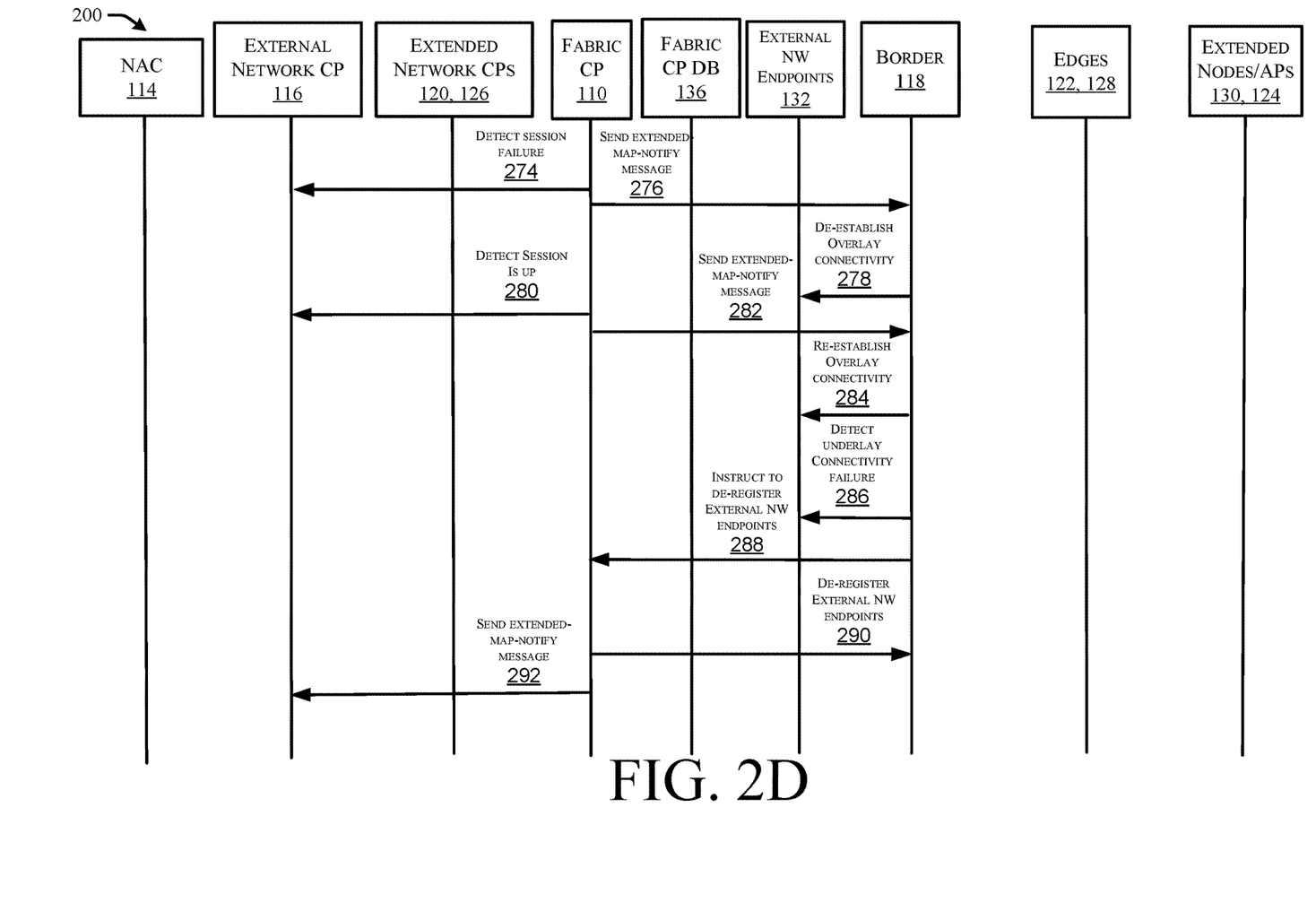

At 258, one of the edges 122, 128 detects underlay connectivity failure between corresponding access points 124/extended nodes 130. At 260, the corresponding edges 122, 128 instruct the fabric controller/control plane 110 to deregister the corresponding access point 124/extended node 130 from the corresponding edges 122, 128. At 262, the fabric controller/control plane 110 deregisters the corresponding access points 124/extended nodes 130 (metadata) from the corresponding edges 122, 128. At 264, the fabric controller/control plane 110 sends an extended-map-notify message 134 to the corresponding controller/control plane 120, 126 to inform the corresponding extended network controller/control plane 120, 126 of the failure.

At 266, one of the edges 122, 128 detects underlay connectivity between corresponding access points 124/extended nodes 130. At 268, the corresponding edges 122, 128 instruct the fabric controller/control plane 110 to re-register the corresponding access point 124/extended node 130 with the corresponding edges 122, 128. At 270, the fabric controller/control plane 110 re-registers the corresponding access points 124/extended nodes 130 (metadata) with the corresponding edges 122, 128. At 272, the fabric controller/control plane 110 sends an extended-map-notify message 134 to the corresponding controller/control plane 120, 126 to inform the corresponding extended network controller/control plane 120, 126 of the connectivity.

Figure 2E:
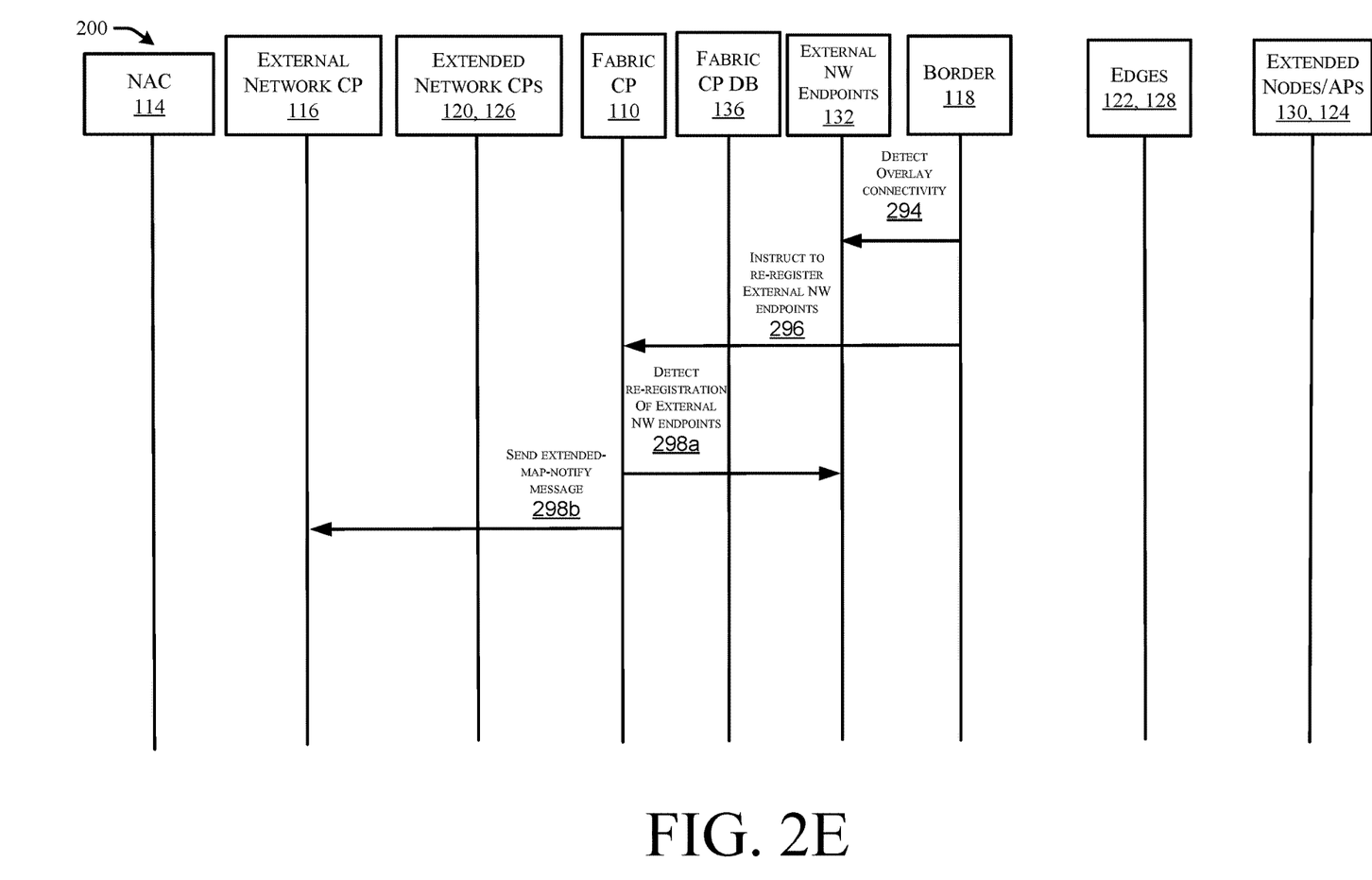

At 274, the fabric controller/control plane 110 detects a session failure between the fabric controller/control plane 110 and the external network controller/control plane 116. At 276, the fabric controller/control plane 110 sends an extended-map-notify message 134 to the border 118 indicating session down and to de-establish overlay connectivity with the corresponding external nodes, e.g., external network endpoints 132. At 278, the border 118 de-establishes the overlay connectivity with the corresponding external nodes. At 280, the fabric controller/control plane 110 detects a session is up between the fabric controller/control plane 110 and the external network controller/control plane 116. At 282, the fabric controller/control plane 110 sends an extended-map-notify message 134 to the border 118 indicating the session is up and to re-establish overlay connectivity with the corresponding access points 124/extended nodes 130. At 284, the border 118 re-establishes the overlay connectivity with the corresponding external nodes.

At 286, the border detects underlay connectivity failure between the border 118 and external nodes, e.g., endpoints 132. At 288, the border 118 instructs the fabric controller/control plane 110 to deregister the external nodes, e.g., external network endpoints 132, from the border 118. At 290, the fabric controller/control plane 110 deregisters the external nodes (metadata), e.g., external network endpoints 132 (metadata), from the border 118. At 292, the fabric controller/control plane 110 sends an extended-map-notify message 134 to the external network controller/control plane 116 to inform the external network controller/control plane 116 of the failure. At 294, the border 118 detects underlay connectivity between the border 118 and the external nodes, e.g., external network endpoints 132. At 296, the border 118 instructs the fabric controller/control plane 110 to register the external nodes, e.g., external network endpoints 132. At 298a, the fabric controller/control plane 110 detects registration of the external nodes 130 (metadata), e.g., external network endpoints 132 (metadata). At 298b, the fabric controller/control plane 110 sends an extended-map-notify message 134 to the external network controller/control plane 116 to inform the external network controller/control plane 116 of the connectivity.

Figure 3:
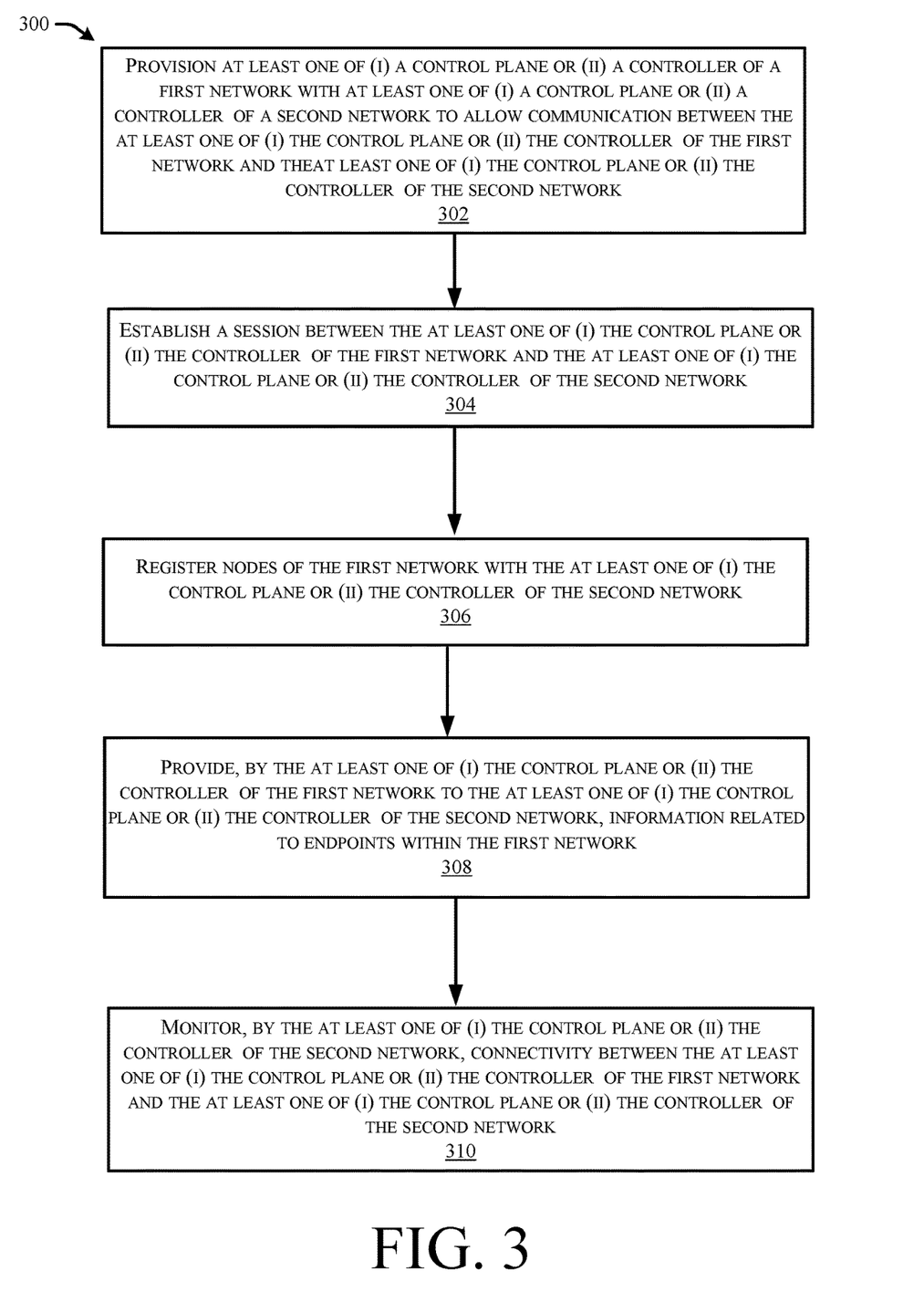
FIG. 3 illustrates a flow diagram of an example method for providing connectivity and monitoring the connectivity of a fabric network controller/control plane with external and extended network controllers/control planes.

FIG. 3 illustrates a flow diagram of an example method 300 and illustrates aspects of the functions performed at least partly by network devices of a network as described with respect to FIGS. 1 and 2A-2E. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for providing connectivity and monitoring the connectivity of a fabric network controller/control plane with external and extended network controllers/control planes. In some examples, the method 300 may be performed by a system comprising one or more processors and one or more non-transitory computer-readable media storing computer-executable instructions that, when executed by the one or more processors, cause the one or more processors to perform the method 300.

At 302, at least one of (i) a control plane or (ii) a controller of a first network is provisioned with at least one of (i) a control plane or (ii) tahe controller of a second network to allow communication between the at least one of (i) the control plane or (ii) the controller of the first network and the at least one of (i) the control plane or (ii) the controller of the second network. For example, one or more of the external network controller 116, wireless extended network controller/control plane 120, and/or wired extended network controller/control plane 126 may be provisioned with the fabric controller/control plane 110.

At 304, a session is established between the at least one of (i) the control plane or (ii) the controller of the first network and the at least one of (i) the control plane or (ii) the controller of the second network. For example, a TCP session may be established between one or more of the external network controller 116, the wireless extended network controller/control plane 120, and/or the wired extended network controller/control plane 126, and the fabric controller/control plane 110.

At 306, nodes of the first network are registered with the at least one of (i) the control plane or (ii) the controller of the second network. For example, access points, extended nodes 130, and/or endpoints 132 are registered with the fabric controller/control plane 110.

At 308, the at least one of (i) the control plane or (ii) the controller of the first network provides, to the at least one of (i) the control plane or (ii) the controller of the second network, information related to endpoints within the first network. For example, one or more of the external network controller 116, the wireless extended network controller/control plane 120, and/or the wired extended network controller/control plane 126 provides information and/or metadata related to one or more of the access points, extended nodes 130, and/or endpoints 132 to the fabric controller/control plane 110.

At 310, at least one of (i) the control plane or (ii) the controller of the second network monitors connectivity between the at least one of (i) the control plane or (ii) the controller of the first network and the at least one of (i) the control plane or (ii) the controller of the second network. For example, the fabric controller/control plane 110 may monitor connectivity of one or more of the external network controller 116, the wireless extended network controller/control plane 120, and/or the wired extended network controller/control plane 126.

Thus, the present disclosure provides techniques and architecture to extend a fabric access control plane to access side extended network endpoints (wired/wireless/IoT network endpoints) and border/internet side external/cloud network endpoints without using route imports and route exports from routing protocols, which may result in issues and loops in the overall network. Instead, the techniques and architecture allow for enabling connectivity monitoring and endpoint information exchange between enterprise fabric control planes and extended network control planes and external network control planes. The techniques and architecture also allow for communicating the status into enterprise fabric components (fabric edge, fabric border, service border), as well as extended network components and external network components to detect failures and take required action.

Figure 4:
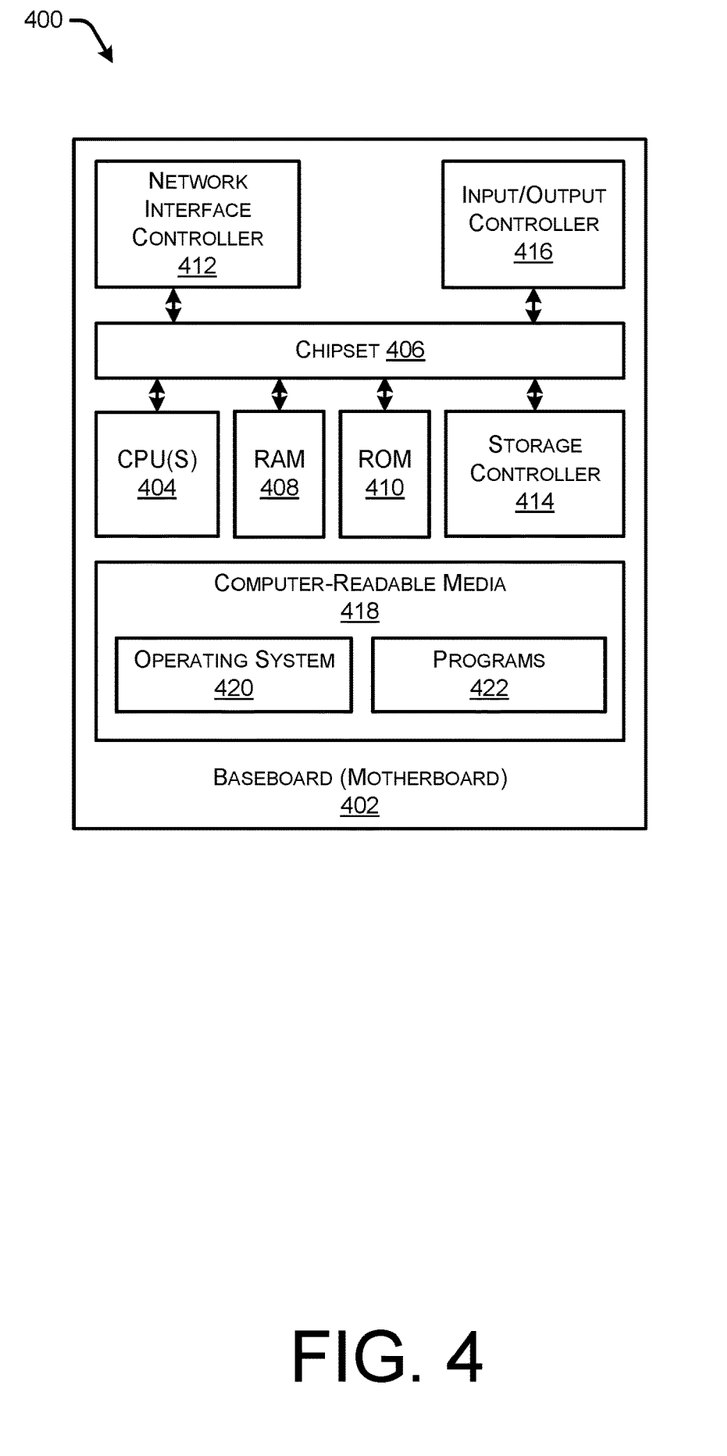
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1 and 2A-2E. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 400 may, in some examples, correspond to a physical devices or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406.

The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the arrangement 100. The chipset 406 can include functionality for providing network connectivity through a NIC 412, such as a gigabit Ethernet adapter. In configurations, the NIC 412 a smart NIC (based on data processing units (DPUs)) that can be plugged into data center servers to provide networking capability. The NIC 412 is capable of connecting the computing device 400 to other computing devices over the networks of the arrangement 100. It should be appreciated that multiple NICs 412 can be present in the computing device 400, connecting the computer to other types of networks and remote computer systems.

The computing device 400 can be connected to a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1 and 2A-2E. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
provisioning, by a network architecture controller (NAC), a control plane of a first network with a control plane of a second network different from the first network to allow communication between the control plane of the first network and the control plane of the second network;
establishing, by the control plane of the first network, a session between the control plane of the first network and the control plane of the second network;
registering, by the control plane of the first network, nodes of the first network with the control plane of the second network;
providing, by the control plane of the first network to the control plane of the second network, information related to endpoints within the first network; and
monitoring, by the control plane of the second network, connectivity between the control plane of the first network and the control plane of the second network.

2. The method of claim 1, further comprising:
provisioning, by the NAC, a control plane of a third network with the control plane of the second network to allow communication between the control plane of the third network and the control plane of the second network;
establishing, by the control plane of the third network, a session between the control plane of the third network and the control plane of the second network;
registering, by the control plane of the third network, nodes of the third network with the control plane of the second network;
providing, by the control plane of the third network to the control plane of the second network, information related to endpoints within the third network; and
monitoring, by the control plane of the second network, connectivity between the control plane of the third network and the control plane of the second network.

3. The method of claim 2, wherein:
the second network is an access network;
the first network is one of a wireless access network, a layer 2 (L2) network, a cloud network, an Internet of Things (IoT) network, or a software defined wide access network (SDWAN); and
the third network is one of a wireless access network, a layer 2 (L2) network, a cloud network, an Internet of Things (IOT) network, or a software defined wide access network (SDWAN).

4. The method of claim 1, wherein provisioning, by the NAC, the control plane of the first network with the control plane of the second network comprises:
instructing, by the NAC, the control plane of the first network to exchange address/information to connect and send first network end point information and metadata from the control plane of the first network to the control plane of the second network;
configuring, by the NAC, the control plane of the second network to allow session/connection and learning of end point information and metadata related to end points of the first network from the control plane of the first network; and
configuring, by the NAC, one of (i) a service border of the first network, (ii) a switched virtual interface (SVI) of an edge of the first network, or (iii) a SVI of an access point of the first network for:
first network node detection; and
receiving a message, wherein the message comprises one or more of mappings for endpoints, first network status, assurance, serviceability, service insertion parameters, session information, or key mismatches.

5. The method of claim 1, wherein establishing, by the control plane of the first network, the session between the control plane of the first network and the control plane of the second network and registering nodes of the first network with the control plane of the second network comprises:
initiating, by the control plane of the first network, the session;
establishing, by the control plane of the first network, the session;
monitoring, by the control plane of the second network, connectivity between the control plane of the first network and the control plane of the second network; and
registering, by one of (i) a service border of the first network, (ii) an edge of the first network, or (iii) an access point of the first network, network nodes.

6. The method of claim 1, wherein the first network is a cloud network and providing, by the control plane of the first network the control plane of the second network, information related to endpoints within the first network comprises:
sending, by the control plane of the first network to the control plane of the second network, information including node addresses related to end points of the first network as metadata;
based at least in part on a node address match, adding, by the control plane of the first network, mappings of the end points within the first network;
registering, by the control plane of the second network to a database of the second network, a border of the first network as a routing locator (RLOC); and
sending, by the control plane of the second network to the border, a message with the metadata.

7. The method of claim 1, wherein the first network is one of a wireless access network or a layer 2 (L2) network and providing, by the control plane of the first network to the control plane of the second network, information related to endpoints within the first network comprises:
sending, by the control plane of the first network to the control plane of the second network, information including node addresses related to end points of the first network as metadata;
based at least in part on a node address match, adding, by the control plane of the first network, mappings of the end points within the first network;
registering, by the control plane of the second network to a database of the second network, either access points or edges of the first network as a routing locator (RLOC); and
sending, by the control plane of the second network to either the access points or edges, a message with the metadata.

8. The method of claim 1, wherein monitoring, by the control plane of the second network, connectivity between the control plane of the first network and the control plane of the second network comprises:
monitoring, by the control plane of the second network, connectivity between the control plane of the first network and the control plane of the second network;
sending, by the control plane of the second network to the control plane of the first network, a message to establish overlay connectivity with nodes of the first network; and
in response to determining a session failure, sending, by the control plane of the second network to the control plane of the first network, another message to de-establish overlay connectivity with nodes of the first network.

9. The method of claim 1, further comprising:
prior to provisioning the control plane of the first network with the control plane of the second network to allow communication between the control plane of the first network and the control plane of the second network, exchanging keys between the control plane of the first network and the control plane of the second network.

10. A system comprising:
one or processors; and
one or more non-transitory computer-readable media storing computer-executable instructions that, when executed by the one or more processors, cause the one or more processors to perform actions comprising:
provisioning, by a network architecture controller (NAC), a control plane of a first network with a control plane of a second network different from the first network to allow communication between the control plane of the first network and the control plane of the second network;
establishing, by the control plane of the first network of the first network, a session between the control plane of the first network and the control plane of the second network;
registering, by the control plane of the first network, nodes of the first network with the control plane of the second network;
providing, by the control plane of the first network to the control plane of the second network, information related to endpoints within the first network; and
monitoring, by the control plane of the second network, connectivity between the control plane of the first network and the control plane of the second network.

11. The system of claim 10, wherein the actions further comprise:
provisioning, by the NAC, a control plane of a third network with the control plane of the second network to allow communication between the control plane of the third network and the control plane of the second network;
establishing, by the control plane of the third network, a session between the control plane of the third network and the control plane of the second network;
registering, by the control plane of the third network, nodes of the third network with the control plane of the second network;
providing, by the control plane of the third network to the control plane of the second network, information related to endpoints within the third network; and
monitoring, by the control plane of the second network, connectivity between the control plane of the third network and the control plane of the second network.

12. The system of claim 11, wherein:
the second network is an access network;
the first network is one of a wireless access network, a layer 2 (L2) network, a cloud network, an Internet of Things (IOT) network, or a software defined wide access network (SDWAN); and
the third network is one of a wireless access network, a layer 2 (L2) network, a cloud network, an Internet of Things (IOT) network, or a software defined wide access network (SDWAN).

13. The system of claim 10, wherein provisioning, by the NAC, the control plane of the first network with the control plane of the second network comprises:
instructing, by the NAC, the control plane of the first network to exchange address/information to connect and send first network end point information and metadata from the control plane of the first network to the control plane of the second network;
configuring, by the NAC, the control plane of the second network to allow session/connection and learning of end point information and metadata related to end points of the first network from the control plane of the first network; and
configuring, by the NAC, one of (i) a service border of the first network, (ii) a switched virtual interface (SVI) of an edge of the first network, or (iii) a SVI of an access point of the first network for:
first network node detection; and
receiving a message, wherein the message comprises one or more of mappings for endpoints, first network status, assurance, serviceability, service insertion parameters, session information, or key mismatches.

14. The system of claim 10, wherein establishing, by the control plane of the first network, the session between the control plane of the first network and the control plane of the second network and registering nodes of the first network with the control plane of the second network comprises:
initiating, by the control plane of the first network, the session;
establishing, by the control plane of the first network, the session;
monitoring, by the control plane of the second network, connectivity between the control plane of the first network and the control plane of the second network; and
registering, by one of (i) a service border of the first network, (ii) an edge of the first network, or (iii) an access point of the first network, network nodes.

15. The system of claim 10, wherein the first network is a cloud network and providing, by the control plane of the first network to the control plane of the second network, information related to endpoints within the first network comprises:
- sending, by the control plane of the first network to the control plane of the second network, information including node addresses related to end points of the first network as metadata;
- based at least in part on a node address match, adding, by the control plane of the first network, mappings of the end points within the first network;
- registering, by the control plane of the second network to a database of the second network, a border of the first network as a routing locator (RLOC); and
- sending, by the control plane of the second network to the border, a message with the metadata.

16. The system of claim 10, wherein the first network is one of a wireless access network or a layer 2 (L2) network and providing, by the control plane of the first network to the control plane of the second network, information related to endpoints within the first network comprises:
- sending, by the control plane of the first network to the control plane of the second network, information including node addresses related to end points of the first network as metadata;
- based at least in part on a node address match, adding, by the control plane of the first network, mappings of the end points within the first network;
- registering, by the control plane of the second network to a database of the second network, either access points or edges of the first network as a routing locator (RLOC); and
- sending, by the control plane of the second network to either the access points or edges, a message with the metadata.

17. The system of claim 10, wherein monitoring, by the control plane of the second network, connectivity between the control plane of the first network and the control plane of the second network comprises:
- monitoring, by the control plane of the second network, connectivity between the control plane of the first network and the control plane of the second network;
- sending, by the control plane of the second network to the control plane of the first network, a message to establish overlay connectivity with nodes of the first network; and
- in response to determining a session failure, sending, by the control plane of the second network to the control plane of the first network, another message to de-establish overlay connectivity with nodes of the first network.

18. The system of claim 10, wherein the actions further comprise:
- prior to provisioning the control plane of the first network with the control plane of the second network to allow communication between the control plane of the first network and the control plane of the second network, exchanging keys between the control plane of the first network and the control plane of the second network.

19. A method comprising:
- provisioning, by a network architecture controller (NAC), a control plane of a cloud network with a control plane of an access network to allow communication between the control plane of the cloud network and the control plane of the access network;
- provisioning, by the NAC, a control plane of a wireless access network with the control plane of the access network to allow communication between the control plane of the wireless access network and the control plane of the access network;
- provisioning, by the NAC, a control plane of a layer 2 (L2) network with the control plane of the access network to allow communication between the control plane of the L2 network and the control plane of the access network;
- establishing, by a control plane of the cloud network, sessions between the control plane of the cloud network and the control plane of the access network;
- establishing, the control plane of the wireless access network, sessions between the control plane of the wireless access network and the control plane of the access network;
- establishing, the control plane of the L2 network, sessions between the control plane of the L2 network and the control plane of the access network;
- registering nodes of (i) the cloud network, (ii) the wireless access network, and (iii) the L2 network with the control plane of the access network;
- providing, by the control planes of the cloud network, the wireless access network, and the L2 network to the control plane of the access network, information related to endpoints within the cloud network, the wireless access network, and the L2 network; and
- monitoring, by the control plane of the access network, connectivity between the control plane and each of the control planes of the cloud network, the wireless access network, and the L2 network.

20. The method of claim 19, wherein monitoring, by the control plane of the access network, connectivity between the control plane of the access network and each of the control planes of (i) the cloud network, (ii) the wireless access network, and (iii) the L2 network comprises:
- monitoring, by the control plane of the access network, connectivity between the control plane of the access network and each of the control planes of (i) the cloud network, (ii) the wireless access network, and (iii) the L2 network;
- sending to the control plane of the cloud network, the control plane of the wireless access network, and the control plane of the L2 network, a message to establish one of (i) overlay connectivity with one or more nodes of the cloud network or (ii) one or more tunnels with nodes of the wireless access network or the L2 network; and
- in response to determining a session failure, sending, by the control plane of the access network to one of the control plane of the cloud network, to the control plane of the wireless access network and the control plane of the L2 network, another message to de-establish (i) overlay connectivity with one or more nodes of the cloud network or (ii) one or more tunnels with nodes of the wireless access network or the L2 network.

* * * * *